(12) United States Patent
Dhariwal et al.

(10) Patent No.: US 10,764,155 B2
(45) Date of Patent: Sep. 1, 2020

(54) SYSTEM AND METHOD FOR ON-DEMAND NETWORK COMMUNICATION

(71) Applicant: CloudSmartz, Inc., Rochester, NY (US)

(72) Inventors: Manjeet Dhariwal, Victor, NY (US); Dan Wagner, Victor, NY (US); Michael Vannest, Churchville, NY (US)

(73) Assignee: CLOUDSMARTZ, INC., Rochester, NY (US)

( * ) Notice: Subject to any disclaimer, the term of this patent is extended or adjusted under 35 U.S.C. 154(b) by 216 days.

(21) Appl. No.: 15/825,949

(22) Filed: Nov. 29, 2017

(65) Prior Publication Data

US 2018/0152356 A1 May 31, 2018

Related U.S. Application Data

(60) Provisional application No. 62/427,466, filed on Nov. 29, 2016.

(51) Int. Cl.
*H04L 12/24* (2006.01)

(52) U.S. Cl.
CPC .......... *H04L 41/22* (2013.01); *H04L 41/5051* (2013.01)

(58) Field of Classification Search
CPC .. H04L 41/5051; H04L 41/22; H04L 12/2859
See application file for complete search history.

(56) References Cited

U.S. PATENT DOCUMENTS

| | | | | |
|---|---|---|---|---|
| 2008/0086526 | A1* | 4/2008 | Jianzhong | H04L 65/4084 709/203 |
| 2010/0174816 | A1* | 7/2010 | Piccinini | H04L 12/2859 709/227 |
| 2013/0159378 | A1* | 6/2013 | Misovski | H04L 41/5051 709/203 |
| 2015/0163523 | A1* | 6/2015 | Benya | H04N 7/17318 725/93 |
| 2016/0080501 | A1* | 3/2016 | Freimuth | H04L 67/141 709/228 |
| 2016/0218943 | A1* | 7/2016 | Djukic | H04L 41/142 |
| 2016/0234081 | A1* | 8/2016 | Mongazon-Cazavet | H04W 28/24 |
| 2017/0346704 | A1* | 11/2017 | Strijkers | G06F 9/5005 |
| 2018/0091604 | A1* | 3/2018 | Yamashita | H04L 67/16 |
| 2018/0092057 | A1* | 3/2018 | Yamashita | H04W 4/12 |

* cited by examiner

*Primary Examiner* — Abdullahi E Salad
(74) *Attorney, Agent, or Firm* — Rossi, Kimms & McDowell LLP (57) ABSTRACT

A network system configured to provide software defined networking is described. The network system comprises networking hardware such as network controllers, memory and other storage devices, and processors. The processors execute instructions to implement various program modules. A user interface permits a user to generate a request for generating an on-demand network connection. A flow module generates a network flow request, based on the received request for generating the on-demand network connection, and transmits the network flow request to a controller module. The controller module controls the network controllers to generate the on-demand network connection based on the generated network flow request.

4 Claims, 5 Drawing Sheets

SYSTEM AND METHOD FOR ON-DEMAND NETWORK COMMUNICATION

TECHNICAL FIELD

Aspects of this disclosure generally are related to a software defined networking (SDN) system and methods that manages network services to provide dynamic and scalable computing, networking, and storage services.

BACKGROUND OF THE INVENTION

Software defined networking permits management of network services and network infrastructure using higher-level software systems by abstracting lower-level functionality. A centralized controller decouples the network infrastructure (also called the control plane), which governs how traffic is sent over the network, from the application systems, which govern where to send the traffic (also called the data plane).

An SDN based network architecture differs from traditional static networks in that SDN permits dynamic, scalable reconfiguration of network connections. This permits the control systems to programmatically reconfigure network connections to accommodate changing traffic patterns. However, one major problem with present SDN systems is the proliferation of underlying network controllers, which communicate with various ports and switches to control the flow of network traffic, each requiring customized control software to interface between the application in the data plane and the networking hardware in the control place.

SUMMARY OF THE INVENTION

At least the above-discussed need is addressed and technical solutions are achieved in the art by various embodiments of the present invention. In some embodiments of the invention, a system that provides on-demand networking capability for dynamically generating a network connection based on a request received from a user is provided. The system includes a network GUI that communicates the parameters or conditions provided by the user to a flow module. The flow module can receive inventory information from the inventory module and pricing information from the pricing module to generate requirements for an on-demand network flow. A request to generate the on-demand network flow, along with the requirements, is transmitted to the client's virtual network controller or virtual function orchestrator using an appropriate API.

In some embodiments, a network system configured to provide software defined networking includes one or more network controllers, one or more computer accessible-storage devices, and one or more processors connected to the one or more computer accessible storage devices and configured to execute instructions. In some embodiments, the instructions, when executed, provide a plurality of program modules including a user interface, a flow module, and a controller module. The user interface is configured to receive a request for generating an on-demand network connection. The flow module is configured to generate a network flow request based on the received request for generating the on-demand network connection. The controller module is configured to control the one or more network controllers to generate the on-demand network connection based on the generated network flow request.

In some embodiments, the one or more processors are further configured to execute instructions that, when executed, provide an inventory module configured to receive inventory information corresponding to one or more networking devices available for implementing the on-demand network connection, from the controller module, and transmit the received inventory information to the flow module.

In some embodiments, the one or more processors are further configured to execute instructions that, when executed, provide a pricing module configured to receive pricing information associated with implementing the on-demand network connection and transmit the received pricing information to the flow module.

In some embodiments, the one or more processors are further configured to execute instructions that, when executed, provide a logging module configured to generate and store log information.

In some embodiments, the user interface is further configured to provide one or more views that permit defining the on-demand network connection as a combination of two endpoints associated with a source and a destination for the on-demand network connection.

In some embodiments, the on-demand network connection request includes one or more parameters, the one or more parameters including a latency, a bandwidth, or a duration associated with the requested on-demand network connection.

In some embodiments, the flow module is further configured to generate the network flow request based on the inventory information received from the inventory module.

In some embodiments, the flow module is further configured to generate billing information based on the pricing information received from the pricing module and transmit the billing information to the user interface for display.

In some embodiments, the controller module generates the on-demand network connection by communicating one or more network connection requirements associated with the network flow request to the one or more controllers through an application program interface (API).

In some embodiments, each network controller of the one or more network controllers has an associated API for communication between each network controller and the controller module and the controller module is further configured to generate or manage the associated API for each network controller.

In some embodiments, the controller module is further configured to generate and manage a plurality of APIs to provide communication between the plurality of program modules.

In some embodiments, the network system further comprises a display unit to display the user interface.

In some embodiments, a network system configured to provide software defined networking comprises one or more network controllers, a display unit, one or more computer accessible-storage devices, and one or more processors connected to the one or more computer accessible storage devices and configured to execute instructions. In some embodiments, the instructions, when executed, provide a plurality of program modules including a user interface displayed on the display, an inventory module, a flow module, a pricing module, and a controller module. The user interface is configured to receive a request for generating an on-demand network connection and provide one or more views that permit defining the on-demand network connection as a combination of two endpoints associated with a source and a destination for the network connection, the on-demand network connection including one or more parameters, the one or more parameters including one or more of a latency, a bandwidth, or a duration associated with the requested on-demand network connection. The inventory module is configured to receive inventory information corresponding to one or more networking devices available for implementing the on-demand network connection and transmit the received inventory information to a flow module. The flow module is configured to generate a network flow request based on the received request for generating the on-demand network connection and the received inventory information. The controller module is configured to control the one or more network controllers to, based on the generated network flow request, generate the on-demand network connection by communicating one or more network connection requirements associated with the network flow request to the one or more controllers through an application program interface (API). Each network controller of the one or more network controllers has an associated API for communication between each network controller and the controller module. The controller module is further configured to generate or manage the associated API for each network controller. The controller module is further configured to generate and manage a plurality of APIs to provide communication between the plurality of program modules.

BRIEF DESCRIPTION OF DRAWINGS

It is to be understood that the attached drawings are for purposes of illustrating aspects of various embodiments and may include elements that are not to scale.

DETAILED DESCRIPTION

Some embodiments of the present invention pertain to a software defined networking (SDN) system that manages network services to provide dynamic and scalable computing, networking, and storage services. The SDN system can include various computing devices, controllers, network equipment such as routers and switches, and storage, that are connected to each other and provide an on-demand network connection capability. SDN systems can include networking function virtualization (NFV) to provide virtualized, layered services without requiring direct control of, or access to, the accompanying networking hardware.

In some embodiments, an SDN/NFV system can include a southbound interface and a northbound interface. The southbound side of the SDN/NFV system can start from a network orchestration and control layer utilizing southbound (application program interface) APIs, which enable communication between the orchestration and control layer and a network infrastructure layer. In some embodiments, the southbound side of the SDN/NFV is inclusive of the orchestration and control layer. The northbound side of the SDN/NFV system can start at the northbound APIs, which enable communication between the network orchestration and control layer and the business application layer.

A southbound side API can permit network components such as controllers to communicate with a lower-level component. A northbound side API can permit network components such as controllers to communicate with a higher-level component. In conventional systems, the southbound side APIs can enable communication between an SDN controller and network hardware (such as routers and switches) so that the SDN/NFV system can determine network topology and hardware capabilities to provide on-demand network connection capability. One example of a southbound API is Openflow, developed by the Open Networking Foundation (https://www.opennetworking.org/sdn-resources/openflow).

An OpenFlow enabled SDN controller can communicate with the underlying low-level networking hardware to dynamically determine the capabilities provided by the connected networking hardware, and make adjustments to network connections in response to changing business requirements. With OpenFlow, entries can be added and removed to an internal flow-table of switches and routers to make the network more responsive to real-time traffic demands.

In contrast, the northbound side APIs can enable communication between the SDN controller and applications or other higher layer software. In some embodiments, such communication is provided through the use of southbound and northbound application program interfaces (APIs). Northbound APIs can acquire network capability information from an SDN controller, and provide such information to higher-level components. Northbound APIs can also receive real-time changes to network connection requirements and communicate such information to the SDN controller.

In some embodiments, the computing devices may be configured to execute instructions provided by programs implementing methods for receiving, processing, and executing requests for on-demand network connections in the SDN/NFV system. In some embodiments, one or more of the computing devices may have one or more programs associated therewith. In some embodiments, executing the instructions provided by the programs may include receiving or obtaining information relating to user requirements for an on-demand network connection and underlying network topology and capability.

In the following description, certain specific details are set forth in order to provide a thorough understanding of various inventive embodiments. However, one skilled in the art will understand that other embodiments may be practiced without these details. In other instances, well-known structures have not been shown or described in detail to avoid unnecessarily obscuring descriptions of various inventive embodiments.

Reference throughout this specification to "one embodiment" or "an embodiment" or "an example embodiment" or "an illustrated embodiment" or "a particular embodiment" and the like means that a particular feature, structure or characteristic described in connection with the embodiment is included in at least one embodiment. Thus, the appearances of the phrases "in one embodiment" or "in an embodiment" or "in an example embodiment" or "in this illustrated embodiment" or "in this particular embodiment" and the like in various places throughout this disclosure are not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more. For example, the phrase, "a set of APIs" means one or more of the APIs. In addition, unless otherwise explicitly noted or required by context, the word "subset" is intended to mean a set having the same or fewer elements of those present in the subset's parent or superset.

Further, the phrase "at least" is used herein at times to emphasize the possibility that other elements can exist besides those explicitly listed. However, unless otherwise explicitly noted (such as by the use of the term "only") or required by context, non-usage herein of the phrase "at least" includes the possibility that other elements exist besides those explicitly listed. For example, the phrase, 'based at least upon A' includes A, as well as the possibility of one or more other additional elements besides A. In the same manner, for example, the phrase, 'based upon A' includes A, as well as the possibility of one or more other additional elements besides A. However, for example, the phrase, 'based only upon A' includes only A.

Further, the phrase "in response to" may be used in a context where an event A occurs in response to the occurrence of an event B. In this regard, such phrase can include, for example, that at least the occurrence of the event B causes or triggers the event A.

The term "program" in this disclosure should be interpreted as a set of instructions or modules that can be executed by one or more components in a system, such as a controller system, a computing device, or a data processing device system, in order to cause the system to perform one or more operations. The set of instructions or modules can be stored by any kind of memory device, such as those described subsequently with respect to the memory device system 130 shown in FIG. 1. In addition, it may be described that the instructions or modules of a program are configured to cause the performance of a function. The phrase "configured to" in this context is intended to include at least (a) instructions or modules that are presently in a form executable by one or more data processing devices to cause performance of the function (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the function (e.g., in the case where the instructions or modules are encrypted in a non-executable manner, but through performance of a decryption process, would be translated into a form ready for execution). The word "module" can be defined as a set of instructions.

Figure 1:
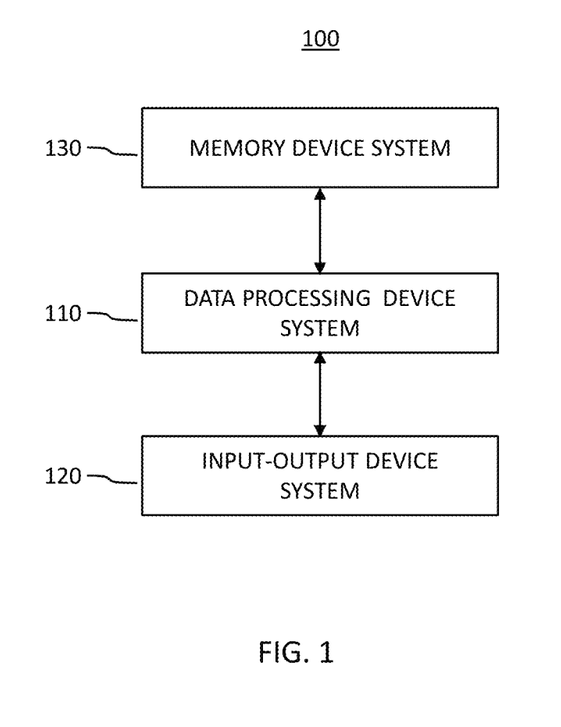
FIG. 1 shows a computing device system, according to embodiments of the invention.
Figure 2:
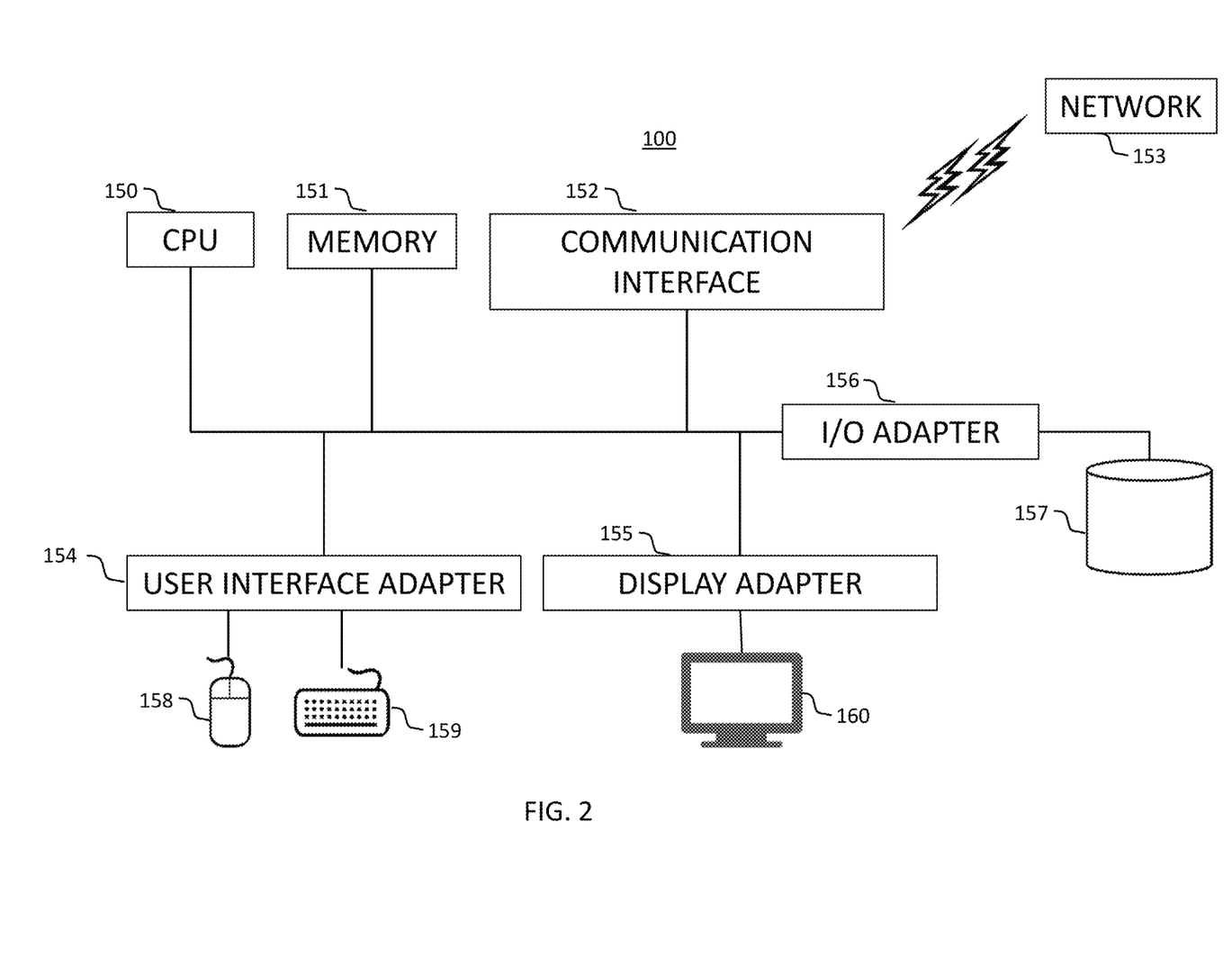
FIG. 2 shows another computing device system, according to embodiments of the invention.

FIG. 1 schematically illustrates a system 100 according to some embodiments. In some embodiments, the system 100 may be a computing device 100 (as shown in FIG. 2). In some embodiments, the system 100 includes a data processing device system 110, an input-output device system 120, and a processor-accessible memory device system 130. The processor-accessible memory device system 130 and the input-output device system 120 are communicatively connected to the data processing device system 110.

The data processing device system 110 includes one or more data processing devices that implement or execute, in conjunction with other devices, such as one or more of those in the system 100, control programs associated with some of the various embodiments. Each of the phrases "data processing device", "data processor", "processor", and "computer" is intended to include any data processing device, such as a central processing unit ("CPU"), a desktop computer, a laptop computer, a mainframe computer, a tablet computer, a personal digital assistant, a cellular phone, and any other device configured to process data, manage data, or handle data, whether implemented with electrical, magnetic, optical, biological components, or other.

The memory device system 130 includes one or more processor-accessible memory devices configured to store information, including the information needed to execute the control programs associated with some of the various embodiments. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs. In some embodiments, each of the phrases "processor-accessible memory" and "processor-accessible memory device" is intended to include a non-transitory computer-readable storage medium. In some embodiments, the memory device system 130 can be considered a non-transitory computer-readable storage medium system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending upon the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 1 can be implemented by a single application-specific integrated circuit (ASIC) in some embodiments.

The input-output device system 120 may include a mouse, a keyboard, a touch screen, another computer, or any device or combination of devices from which a desired selection, desired information, instructions, or any other data is input to the data processing device system 110. The input-output device system 120 may include any suitable interface for receiving information, instructions or any data from other devices and systems described in various ones of the embodiments.

The input-output device system 120 also may include an image generating device system, a display device system, a speaker device system, a processor-accessible memory device system, or any device or combination of devices to which information, instructions, or any other data is output from the data processing device system 110. In this regard, if the input-output device system 120 includes a processor-accessible memory device, such memory device may or may not form part or all of the memory device system 130. The input-output device system 120 may include any suitable interface for outputting information, instructions or data to other devices and systems described in various ones of the embodiments. In this regard, the input-output device system may include various other devices or systems described in various embodiments.

FIG. 2 shows an example of a computing device system 100, according to some embodiments. The computing device system 100 may include a processor 150, corresponding to the data processing device system 110 of FIG. 1, in some embodiments. The memory 151, input/output (I/O) adapter 156, and non-transitory storage medium 157 may correspond to the memory device system 130 of FIG. 1, according to some embodiments. The user interface adapter 154, mouse 158, keyboard 159, display adapter 155, and display 160 may correspond to the input-output device system 120 of FIG. 1, according to some embodiments. The computing device 100 may also include a communication interface 152 that connects to a network 153 for communicating with other computing devices 100.

Further, it is understood that information or data may be operated upon, manipulated, or converted into different forms as it moves through various devices or workflows. In this regard, unless otherwise explicitly noted or required by context, it is intended that any reference herein to information or data includes modifications to that information or data. For example, "data X" may be encrypted for transmission, and a reference to "data X" is intended to include both its encrypted and unencrypted forms. For another example, "image information Y" may undergo a noise filtering process, and a reference to "image information Y" is intended to include both the pre-processed form and the noise-filtered form. In other words, both the pre-processed form and the noise-filtered form are considered to be "image information Y". In order to stress this point, the phrase "or a derivative thereof" or the like may be used herein. Continuing the preceding example, the phrase "image information Y or a derivative thereof" refers to both the pre-processed form and the noise-filtered form of "image information Y", with the noise-filtered form potentially being considered a derivative of "image information Y". However, non-usage of the phrase "or a derivative thereof" or the like nonetheless includes derivatives or modifications of information or data just as usage of such a phrase does, as such a phrase, when used, is merely used for emphasis.

Figure 3:
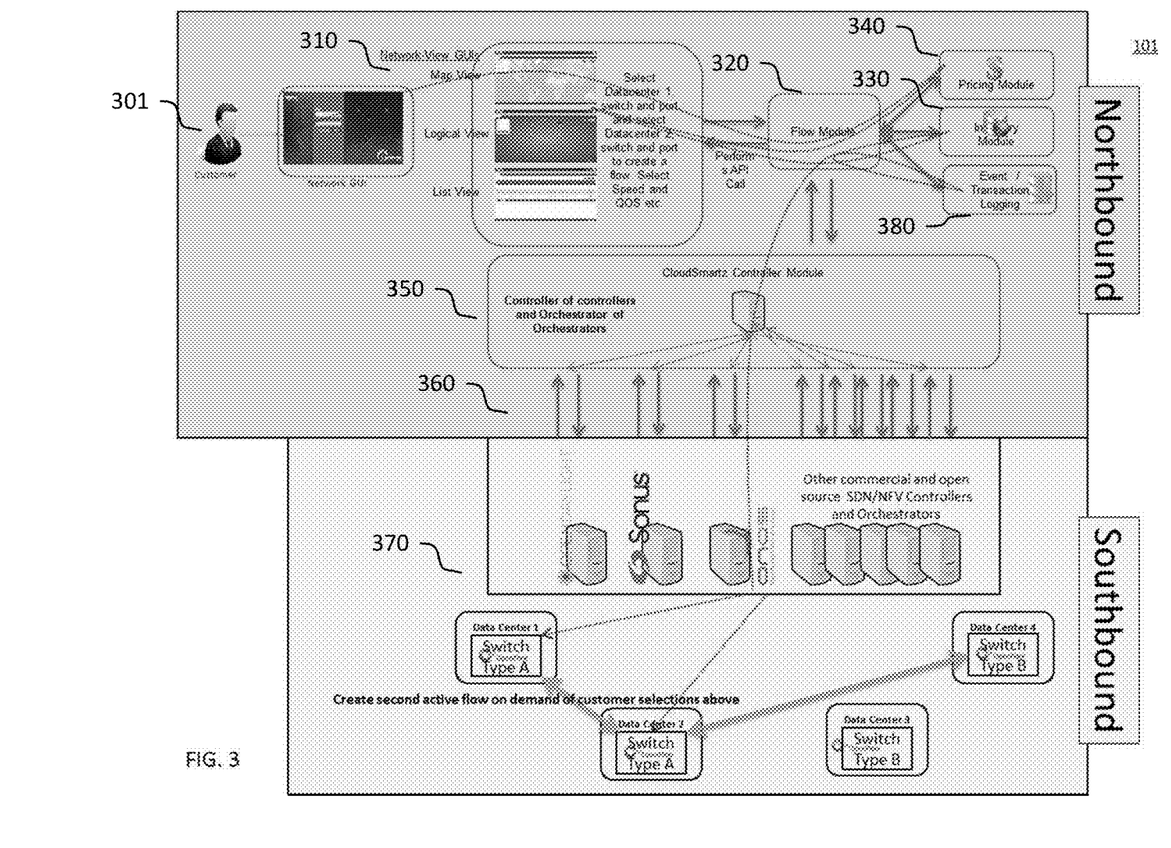
FIG. 3 shows a software-defined networking system, according to embodiments of the invention.

FIG. 3 shows an example of an SDN/NFV system 101, according to various example embodiments. In some embodiments, the system 101 provides on-demand networking capability for dynamically generating a network connection based on a request received from a user (customer) 301. The SDN/NFV system 101 includes a network graphical user interface (GUI) 310, a flow module 320, an inventory module 330, a pricing module 340, a logging module 380, an aggregated/normalized controller modules (API manager) 350, one or more APIs 360, and networking hardware 370.

Figure 4:
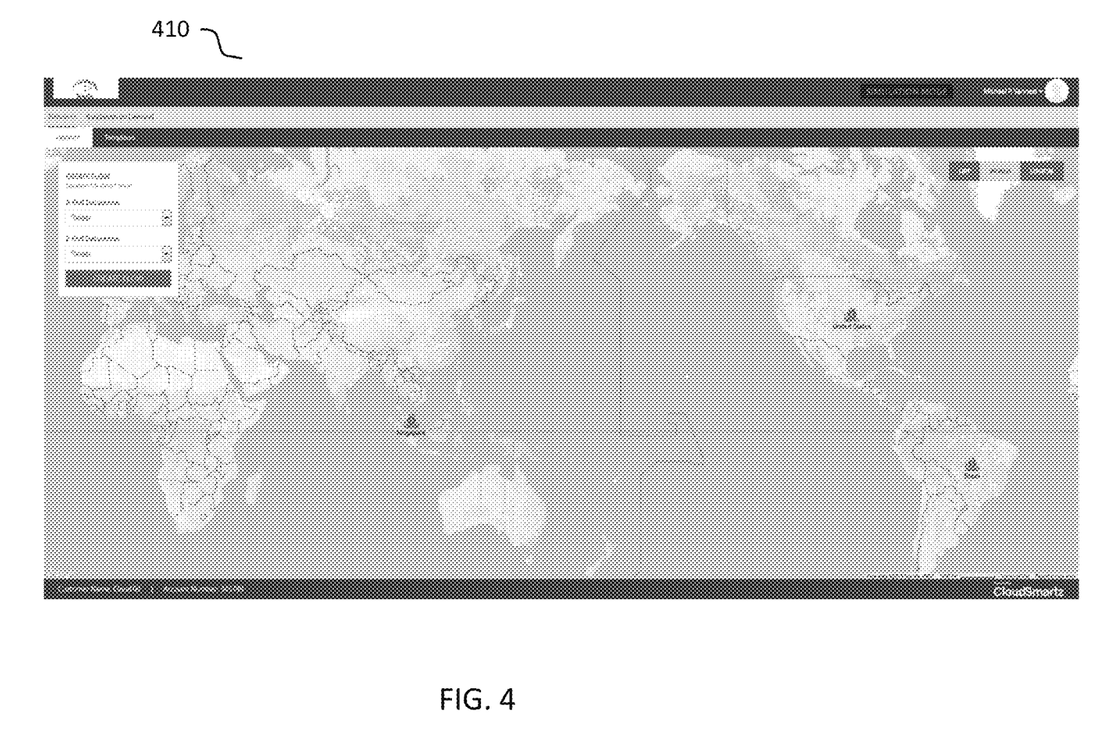
FIG. 4 shows an exemplary view for a graphical user interface, according to embodiments of the invention.

The network graphical user interface 310 includes a plurality of user interface screens provided to a Customer (user 301) of a Service Provider. In some embodiments, these views may be based on available datacenters and existing flows corresponding to the Service Provider, for example, based on their existing network. FIG. 4 shows an example of a geographical map view 410 of the customer's network. In this exemplary view, the datacenters are geographically plotted on a map relative to their latitude and longitudes. The customer 301 can see all the datacenters or network end-points plotted on their map. They can further click into their existing network for various details and to make modifications to their existing configurations. From this view the customer can also select, for example, two datacenters or other endpoints (defined as anywhere the service provider has determined to put a switch—usually datacenters).

Figure 5:
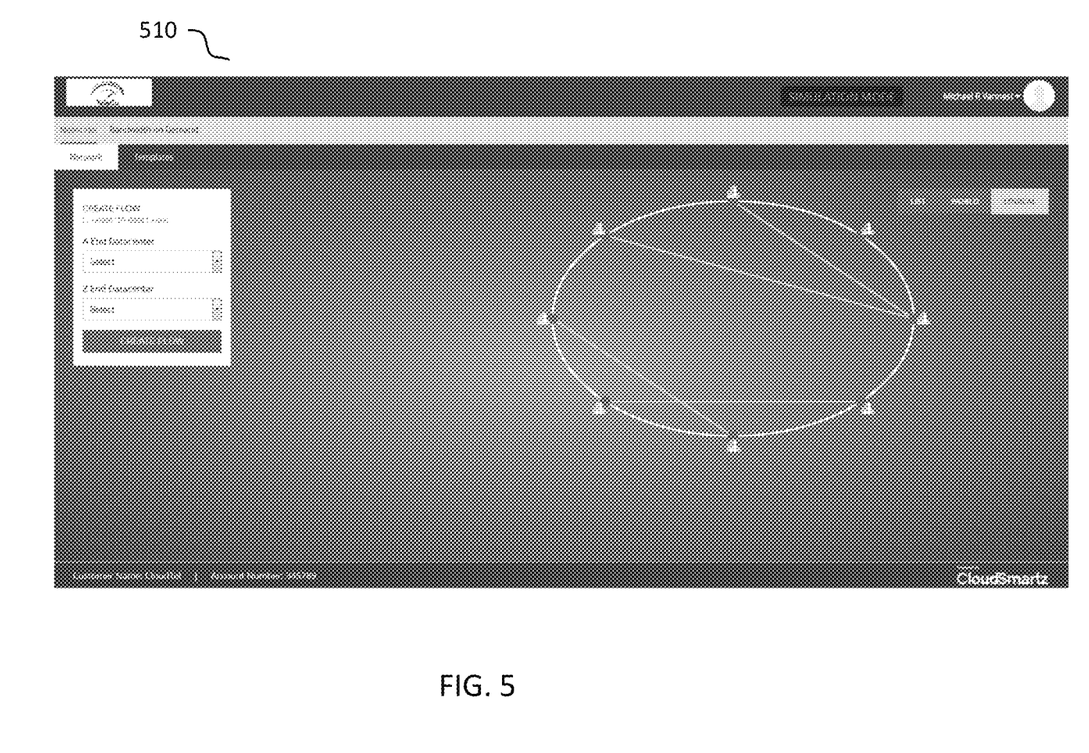
FIG. 5 shows another exemplary view for a graphical user interface, according to embodiments of the invention.

FIG. 5 shows another exemplary view of the customer's network, presented in the user interface 310. The second view is a logical view 510 of the network. Essentially, the endpoints are placed around in a circular view and lines are drawn between endpoints, the lines indicative of currently active flows. In the logical view 510, there is no consideration for the geographical location of these network endpoints. Similar to the geographical map view 410, the customer 301 can select any two endpoints and either modify existing flows or create new flows. A third exemplary view (not shown) is a list view. In some embodiments, a list view may list the customer's existing flows, flows that can be created, or some combination of both.

A customer 301 may be assigned (by the Service Provider) with ports which are on switches, which are in datacenters. The Service Provider may also supply pricing parameters associated with various network connections (flows) that can be created between two end-points. In some embodiments, the customer 301 can create or modify a flow between any two ports which have been assigned to them by the Service Provider. Flows may be created with one or more of the following options determined by the customer 301, each option having a pricing impact.

Customer selects their two preferred end points. (A and Z ports).

Customer selects their preferred latency defined by their service level agreements (SLAs). The SLAs have pricing impacts, based on the desired latency.

Customer selects their preferred Bandwidth (which has pricing impacts) in Mbps or Kbps Customer selects their preferred duration in minutes, hours, days, months, years.

Customer can choose to auto extend the duration for any period of time.

Customer can deploy these selections for this flow on-demand from this screen.

In some embodiments, a flow module 320 controls how the system reacts to user actions taken from the control GUIs 310. For example, the system can execute instructions in the flow module 320 to capture price variable items and fetch pricing when appropriate in real time, pull customer specific inventory based on user and associated corporate account(s), or send customer-chosen flow parameters to controllers/orchestrators and on down to the network elements for flow creation.

In some embodiments, the service provider can set up pricing associated with various options for creating a network flow or connection, as discussed above, in a pricing module 340. There are many variables in customer selections that can drive pricing. The service provider can select these parameters and apply pricing to the pricing algorithms that are exercised as the customer 301 makes their parameter selections through the customer GUI 310. Because the services are on-demand, the pricing must be completed and supplied to the customer in real time back through the GUI. The pricing algorithm may be available to the service provider but not to the customer 301 directly.

In some embodiments, the inventory module 330 can determine switches and ports available for generating network flows from the network through the controllers. The inventory module 330 can also maintain its own inventory of assets (i.e. datacenters relative to the switches associated with them) and existing and discontinued customer services.

In some embodiments, the logging module 380 captures and tracks billable activities taken by the customer 301, actions taken on the network, service provider activities and by whom in every case.

In some embodiments, the various modules of FIG. 3 can be implemented as software programs stored in memory 151 and executed by processor 150 of the computing devices 100 of FIGS. 1 and 2.

In some embodiments, the controller module 350 responds to customer requests or service provider changes to the correct controller or orchestrator to provide "real-time" or on-demand services to support the received request. The controller module 350 also provides an abstraction layer that hides the complexities of the underlying networking controllers or orchestrators and their commands from the supporting operating and business support systems (OSS/BSS), such as the flow module 320, inventory module 330, and pricing module 340 of the software defined networking system. In some embodiments of this inventions, the layer of abstraction and logic provided by the controller module 350 permits service provides such as a telecommunications company to effectively ignore the underlying hardware infrastructure when define services provided by the various OSS/BSS modules. The controller module 350 provides a very simplified model for the OSS/BSS layers to deal with when trying to define and market various on-demand services, by providing plug-and-play capabilities where the controller module 350 interacts with a wide variety of networking hardware. In some embodiments, the controller module 350 is also referred to as an API manager because the controller module 350 generates and manages APIs that permit communication between the southbound and northbound portions of a software defined network system, as shown in FIG. 3.

In some embodiments, a user 301 can create a network connection (network flow) using the network GUI 310. The network flow can be created in response to one or more parameters or conditions provided by the user 301. For example, the parameters and conditions can include one or more of an originating data processing device system (source datacenter), a destination data processing device system (destination datacenter), networking hardware such as routers, switches, and ports associated with the source datacenter and destination datacenter, bandwidth, latency, user account information, and renewal.

In some embodiments, the network GUI 310 communicates the parameters or conditions provided by the user to the flow module 320. The flow module 320 receives inventory information from the inventory module 320 and pricing information from the pricing module 330 to generate requirements for an on-demand network flow and transmits a request to generate the on-demand network flow, along with the requirements, to the client's virtual network controller or virtual function orchestrator using an appropriate API.

The API manager 350 can generate and manage various types of APIs to permit communication between various modules of the software defined networking system. In some embodiments of the invention, integration-ready APIs permit connections between, and communication among, the OSS modules (for example, flow module 320, inventory module 330, or pricing module 340) and a customer or service provider's legacy systems. The integration-ready APIs permit the software-defined networking system to be easily integrated into a customer or service provider's existing technology infrastructure without requiring extensive customization of the SDN system or expensive integration operations.

In some embodiments, the API manager 350 further includes intra-platform APIs that permit communications between various modules of the software-defined networking system. For example, intra-platform APIs provide communications pathways between each of the graphical user interface 310, flow module 320, inventory module 330, pricing module 340, and logging module 380.

Northbound/southbound APIs sit between the software-defined networking system and the underlying networking hardware and infrastructure. The northbound/southbound APIs permit the software-defined networking system to connect and communicate with a wide variety of controllers and orchestrators to generate and manage network flows.

The API manager (controller module) 350 communicates with a client's virtual SDN controller via the northbound/southbound APIs. There are APIs to provide the SDN controller with the request for generating the on-demand network flow requested by the user 301. The SDN controller utilizes southbound APIs to communicate with the underlying network architecture to generate the requested network flow and sends a response back to the network GUI 301, notifying the user 301 whether the network flow was successfully generated.

In some embodiments, an Open Network Operating System (ONOS) may be used to automatically generate and manage the various APIs required for communication between various modules of the software-defined networking system. ONOS provides scalability, high availability, high performance, and abstractions that permit the software-defined networking system to easily generate and manage a variety of APIs.

In some embodiments, the API manager 350 permits designing and publishing APIs, creating and managing a developer community, and securing and routing API traffic in a scalable way. The API manager manages client-exposed APIs that enable communication between various server-side applications, and between server-side and client-side applications.

In some embodiments, the API manager can be used to design and prototype APIs for deployment. Prototype APIs can be used to provide early access to desired API functionality, and receive feedback to improve the APIs. In some embodiments, the APIs can be implemented using JavaScript™. The API manager also supports publishing SOAP™, REST™, JSON™, and XML™ style services as APIs. On-demand generation and management of APIs permit the service provider to present the customer 301 with on-demand services rather than silos of products which are not on-demand.

In some embodiments, the API manager provides additional functions to publish and govern APIs for use in the SDN/NFV system. The API manager can publish APIs to external consumers and partners, as well as to internal users. The APIs can be published to a selected set of gateways in a multi-gateway environment. The API manager can support enforcement of corporate policies for actions like API subscriptions and application creation via customizable workflows. The API manager can manage API visibility and restrict access to specific partners or customers. Accordingly, in some embodiments, the API manager can manage API lifecycle from cradle to grave: create, publish, block, deprecate, and retire APIs.

In some embodiments, the API manager can publish both production and sandbox keys for APIs in order to enable easy developer testing. The API manager can manage API versions and deployment status by version. The API manager can also customize the API lifecycle, including executing custom behavior on lifecycle transitions.

In some embodiments, the API manager can be used to control access and enforce security and compliance. The API manager can restrict API access tokens to specific domains/IPs, validate APIs payload contents against a schema, apply security policies such as authentication and authorization to APIs, plug third-party key servers in lieu of a default server for application registration, token generation, and validation, block or restrict subscriptions or applications, associate APIs to system-defined service tiers, generate JSON™ web tokens for consumption by back-end servers, configure single sign-on (SSO) using SAML 2.0™ for easy integration with existing web apps, and provide threat protection, bot detection, and token-fraud detection.

In some embodiments, the API manager 350 can be used to manage and scale API traffic. The API gateway can act as an SSL termination point. Separate production and sandbox traffic can be routed on different API gateways. A Traffic Manager can be used to enforce rate limits and dynamic throttling based on usage quotas and bandwidth quotas. These functions permit the API manager to provide horizontal scalability with easy deployment into a cluster. The APIs have extremely high performance pass-through message routing with minimal latency.

In some embodiments, the API manager 350 also provides capability to analyze logs collected by a logging module. The logs can include information pertaining to application errors, API deployment statistics, login errors, number of API failures, and access token errors. The logging is also responsible for capturing billable events and durations. If a user goes into the system and adds to a flow and changes the duration, that must all be captured and organized for billing and audit purposes (as to who did what and when).

The logging module records various instructions and functions performed by the SDN/NFV system into various logs. The logs can be broadly categorized into three categories: information logs, warning logs, and error logs.

In some embodiments, one or more information logs can capture information associated with various functions performed by the SDN/NFV system. For example, an information log can record external system calls, including the request received from the customer 301 and the respective response.

In some embodiments, one or more warning logs can capture potential warning conditions, which are handled by the SDN/NFV system, and attempt to sanitize or correct conflicting scenarios. For example, if input data received from a user 301 via network GUI 310 is incorrect or the combination of the input data is not valid, the warning log records a warning condition associated with the incorrect or invalid input data.

In some embodiments, one or more error logs can capture error conditions or exceptions that can occur within the various modules associated with the SDN/NFV system. This can include failure of external system calls or failure to read mandatory data from a database, such as one storing inventory information. Error conditions or exceptions can be generated in a case where there may not be any valid default or alternate course of action to complete the request received from the user 301. For example, if a deployment to a controller fails and the controller API returns a 500 internal server error message, such error condition is recorded in the error log, network flow request is rolled back, and the error condition is reported to the user 301 via the network GUI 310.

In some embodiments, the logging module 380 provides efficient, secure, accurate, and easily retrievable storage of the basis for billing, and for resolving any disputes that may arise. Some features of the logging module include 1) Providing the necessary audit of what actions customers have taken and who took them. Since customers are now taking actions that automatically and directly impact their service and by extension their invoice/billing, these actions should be captured in case there are disputes.

2) Providing the basis for billing the customer, for the combination of bandwidth, quality of service and duration which they themselves have selected for their service.

In some embodiments, the logging module 380 captures the log information on a server. One example of a log server is a web server, such as that provided by a Liferay tomcat web server. Various search and organization tools/processes can be used to efficiently sort, manage, and store the log data for easy searching and retrieval. An example of a search engine that can be used for retrieving log data is "Elastic Search". An example of a log data organization tool is "Logstash". An example of a user interface that can be used to provide analytic information from the logging module 380 is Kibana.

In some embodiments, the logging module 380 captures the logs and stores them in a database that can be organized, for example, as an ELK stack (Elastic Search-Logstash-Kibana). Elastic Search is a search engine based on Lucene. It provides a distributed, multitenant-capable full-text search engine with an HTTP web interface and schema-free JSON documents. Elastic Search is developed in Java and is released as open source under the terms of the Apache License. In some embodiments, Elastic Search is the storage engine where the logs are saved.

Logstash is an open source tool for collecting, parsing, and storing logs for future use. It is the tool which collects and transforms the logs so that they can be used by a search engine such as Elastic Search.

Kibana is an open source (Apache Licensed), browser-based analytics and search dashboard for Elastic Search. Kibana is easy to setup and start using. Kibana strives to be easy to get started with, while also being flexible and powerful, just like Elastic Search.

Subsets or combinations of various embodiments described above provide further embodiments. These and other changes can be made to various embodiments in light of the above-detailed description. In general, the terms used should not be construed to limit the invention to the specific embodiments disclosed in the specification and the claims, but should be construed to include other systems. Accordingly, the invention is not limited by this disclosure, but instead its scope is to be determined entirely by the claims.

The invention claimed is:

1. A network system configured to provide an on-demand network connection between two ports, the on-demand network connection having hardware characteristics provided by software defined networking, comprising:
   one or more network controllers;
   a display unit;
   one or more computer accessible-storage devices; and
   one or more processors connected to the one or more computer accessible storage devices and configured to execute instructions that, when executed, provide a plurality of program modules including:
   a user interface displayed on the display, the user interface configured to receive a request for generating the on-demand network connection and provide one or more views that permit defining the on-demand network connection as a combination of two endpoints associated with a source port on a first networking device and a destination port on a second networking device for the network connection, the on-demand network connection including one or more parameters that define the hardware characteristics of the on-demand network connection between the first networking device and the second networking device, the one or more parameters including one or more of a latency, a bandwidth, or a duration associated with the requested on-demand network connection;
   an inventory module configured to receive inventory information corresponding to one or more networking devices available for implementing the on-demand network connection and transmit the received inventory information to a flow module;
   the flow module configured to generate a network flow request based on the received request for generating the on-demand network connection and the received inventory information; and
   a controller module configured to control the one or more network controllers to, based on the generated network flow request, generate the on-demand network connection by communicating one or more network connection requirements associated with the network flow request to the one or more network controllers through an application program interface (API),
   wherein each network controller of the one or more network controllers has an associated API for communication between each network controller and the controller module,
   wherein the controller module is further configured to generate or manage the associated API for each network controller, and
   wherein the controller module is further configured to generate and manage a plurality of APIs to provide communication between the plurality of program modules.

2. The network system of claim 1, wherein the one or more processors are further configured to execute instructions that, when executed, provide a pricing module configured to receive pricing information associated with implementing the on-demand network connection and transmit the received pricing information to the flow module.

3. The network system of claim 1, wherein the one or more processors are further configured to execute instructions that, when executed, provide a logging module configured to generate and store log information.

4. The network system of claim 2, wherein the flow module is further configured to generate billing information based on the pricing information received from the pricing module and transmit the billing information to the user interface for display.

* * * * *